United States Patent
van Kilsdonk et al.

(10) Patent No.: US 12,439,898 B2
(45) Date of Patent: Oct. 14, 2025

(54) CYCLONE SEPARATION SYSTEM

(71) Applicant: Protix B.V., Dongen (NL)

(72) Inventors: Jaap van Kilsdonk, Dongen (NL);
Eric Holland Schmitt, Dongen (NL);
Ralf Henricus Wilhelmina Jacobs, Dongen (NL); Henricus Petrus Johannes Simons, Dongen (NL);
Maurits Petrus Maria Jansen, Dongen (NL); Ward Tollenaar, Dongen (NL);
Hubertus Lourentius Hulsebos, Dongen (NL)

(73) Assignee: Protix B.V., Dongen (NL)

( * ) Notice: Subject to any disclaimer, the term of this patent is extended or adjusted under 35 U.S.C. 154(b) by 158 days.

(21) Appl. No.: 18/560,934

(22) PCT Filed: May 13, 2022

(86) PCT No.: PCT/NL2022/050261
§ 371 (c)(1),
(2) Date: Nov. 15, 2023

(87) PCT Pub. No.: WO2022/245206
PCT Pub. Date: Nov. 24, 2022

(65) Prior Publication Data
US 2024/0226918 A1    Jul. 11, 2024

(30) Foreign Application Priority Data

May 19, 2021    (NL) ...................................... 2028241

(51) Int. Cl.
*A01K 67/366*    (2025.01)
*B04C 5/02*    (2006.01)
(Continued)

(52) U.S. Cl.
CPC .............. *A01K 67/366* (2025.01); *B04C 5/02* (2013.01); *B04C 5/12* (2013.01); *B04C 5/14* (2013.01);
(Continued)

(58) Field of Classification Search
CPC .......... A01K 67/366; B04C 5/02; B04C 5/12; B04C 5/14; B04C 9/00; B04C 2009/008;
(Continued)

(56) References Cited

U.S. PATENT DOCUMENTS

| | | | |
|---|---|---|---|
| 4,853,003 | A | 8/1989 | Dewitz |
| 5,594,654 | A | 1/1997 | Shuman et al. |

(Continued)

FOREIGN PATENT DOCUMENTS

| | | |
|---|---|---|
| FR | 1130633 A | 2/1957 |
| GB | 429028 A | 5/1935 |

(Continued)

*Primary Examiner* — Kimberly S Berona
*Assistant Examiner* — Katherine June Walter
(74) *Attorney, Agent, or Firm* — Ipsilon USA—NLO

(57) ABSTRACT

A cyclone separation system (1) for separating live insects, comprising a discharge nozzle (5) having a discharge end (7) comprising a discharge channel (8) for discharging live insects from the cyclone separation system (1) when in use. The discharge channel (8) comprises primary air injection channels (11) arranged to provide an injected upstream air flow (F) in an upstream direction (U) back into the discharge nozzle (5) for stopping discharge of live insects. The discharge nozzle (5) comprises an inner wall part (12) extending between an intake end (6) of the discharge nozzle (5) and the discharge channel (8), wherein the inner wall part (12) comprises elongated secondary air injection channels (13) extending from the discharge channel (8) in the upstream direction (U), wherein the secondary air injection channels
(Continued)

(13) are arranged to provide an injected lateral air flow (V) along the inner wall part (12).

15 Claims, 6 Drawing Sheets

(51) Int. Cl.
  *B04C 5/12* (2006.01)
  *B04C 5/14* (2006.01)
  *B04C 9/00* (2006.01)
  *B65G 53/60* (2006.01)
(52) U.S. Cl.
  CPC ............... *B04C 9/00* (2013.01); *B65G 53/60* (2013.01); *B04C 2009/008* (2013.01); *B65G 2203/0241* (2013.01); *B65G 2203/0258* (2013.01); *B65G 2203/041* (2013.01)

(58) Field of Classification Search
  CPC ............ B65G 53/60; B65G 2203/0241; B65G 2203/0258; B65G 2203/041
  See application file for complete search history.

(56) References Cited

U.S. PATENT DOCUMENTS

| | | |
|---|---|---|
| 10,051,845 B1 | 8/2018 | Massaro et al. |
| 2005/0115408 A1 | 6/2005 | Kilgore |
| 2005/0242007 A1 | 11/2005 | Simpson |
| 2018/0049414 A1 | 2/2018 | Leo |

FOREIGN PATENT DOCUMENTS

| | | | | |
|---|---|---|---|---|
| RU | 2336696 C1 | 10/2008 | | |
| WO | WO-2019125162 A1 | * | 6/2019 | ............ A01K 67/30 |
| WO | 2020106150 A1 | 5/2020 | | |

* cited by examiner

CYCLONE SEPARATION SYSTEM

FIELD OF THE INVENTION

The present invention relates to a cyclone separation system for separating live insects from an air stream. In a further aspect the present invention relates to a method of separating live insects from an air stream, and in particular a method of providing batches of live insects.

BACKGROUND ART

Patent application WO2020/106150 A1 discloses a cyclone separation system for separating live insects carried by an air stream, comprising a main cyclone chamber having a top chamber part and a conical shaped bottom chamber part. The top chamber part is connected to one or more intake channels each of which is arranged for connection to a primary air source providing an air stream comprising live insects. The bottom chamber part is connected to a discharge nozzle comprising a discharge end having a main discharge conduit for discharging the live insects from the cyclone separation system, wherein the discharge end comprises an air injection member for connection to a secondary air source and wherein the air injection member is configured to inject air back into the discharge nozzle.

Patent application US 2018/049414 A1 discloses an Insect Production Superstructure Systems (IPSS) to produce insects for human and animal consumption, and for the extraction and use of lipids for applications involving medicine, nanotechnology, consumer products, and chemical production with minimal water, feedstock, and environmental impact. The IPSS may comprise a cyclone separation system for separating live insects carried by an air stream.

Patent application GB 429 028 A discloses a centrifugal separator for separating and collecting dust or other solid particles from air and gases, and of the class in which the dust-laden air or gas is propelled into a vessel in such a manner as to create therein a vortical motion.

SUMMARY OF THE INVENTION

The present invention aims to provide a cyclone separation system for separating live insects from an air stream, such as neonate larvae, wherein the cyclone separation system allows for efficient and reliable batch wise discharge of live insects from the cyclone separation system whilst keeping the live insects alive and preventing that the live insects stick or adhere to internal walls of the cyclone separation system. The cyclone separation system is ideally suited for automated live insect processing facilities.

According to the present invention, a cyclone separation system is provide as mentioned in the preamble above comprising a main cyclone chamber having a top chamber part and a conical shaped bottom chamber part, wherein the top chamber part is connected to one or more intake channels each of which is arranged for connection to a primary air source providing a primary air stream carrying live insects.

A discharge nozzle is provided having an intake end and a discharge end, wherein the intake end is connected to the bottom chamber part, and wherein the discharge end comprises a discharge channel for discharging the live insects from the cyclone separation system.

The discharge end comprises an air injection member for connection to a secondary air source providing a secondary air stream to the air injection member, wherein the air injection member comprises an air chamber for connection to the secondary air source, and a plurality primary air injection channels fluidly connecting the air chamber and the discharge channel. Each of the primary air injection channels is arranged to provide an injected upstream air flow in an upstream direction back into the discharge nozzle for stopping the discharge of the separated live insects.

The discharge nozzle comprises an inner wall part extending between the intake end and the discharge channel, and wherein the inner wall part comprises a plurality of elongated secondary air injection channels fluidly connected to the air chamber and extending from the discharge channel in the upstream direction. Each of the secondary air injection channels is arranged to provide an injected lateral air flow along the inner wall part.

According to the present invention, the air injection member of the discharge end is configured for injecting air back into the discharge nozzle, i.e. in the upstream direction, so that separated live insects in the discharge nozzle moving in downstream direction can be stopped and suspended or cushioned in air by the injected upstream air flow. Through the upstream air flow, the discharge of live insects can be stopped and as such the air injection member acts like a controllable air valve. Furthermore, the upstream air flow reduces damage to live insects and minimizes clump formation of live insects in the discharge nozzle.

The plurality of elongated secondary air injection channels are particularly advantageous for further reducing clump formation on the inner wall part by virtue of lateral air flow provided by the secondary air injection channels. Each of the secondary air injection channels is capable of inducing a distributed vortical air flow along the inner wall part so that clumps of live insects can be removed.

SHORT DESCRIPTION OF DRAWINGS

The present invention will be discussed in more detail below, with reference to the attached drawings, in which FIG. 1 shows a schematic view of a cyclone separation system according to an embodiment of the present invention;

DESCRIPTION OF EMBODIMENTS

Figure 1:
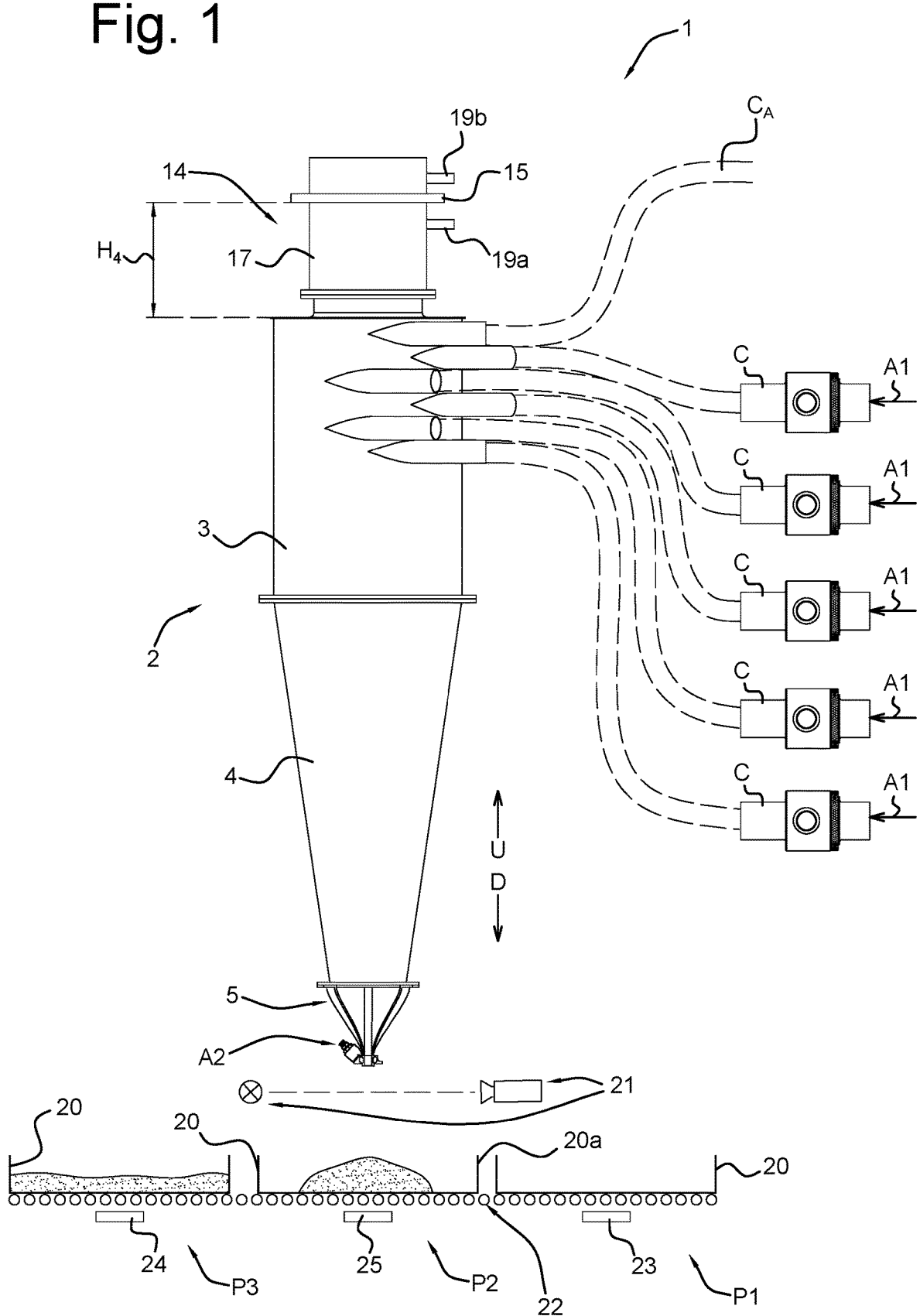
Figure 2:
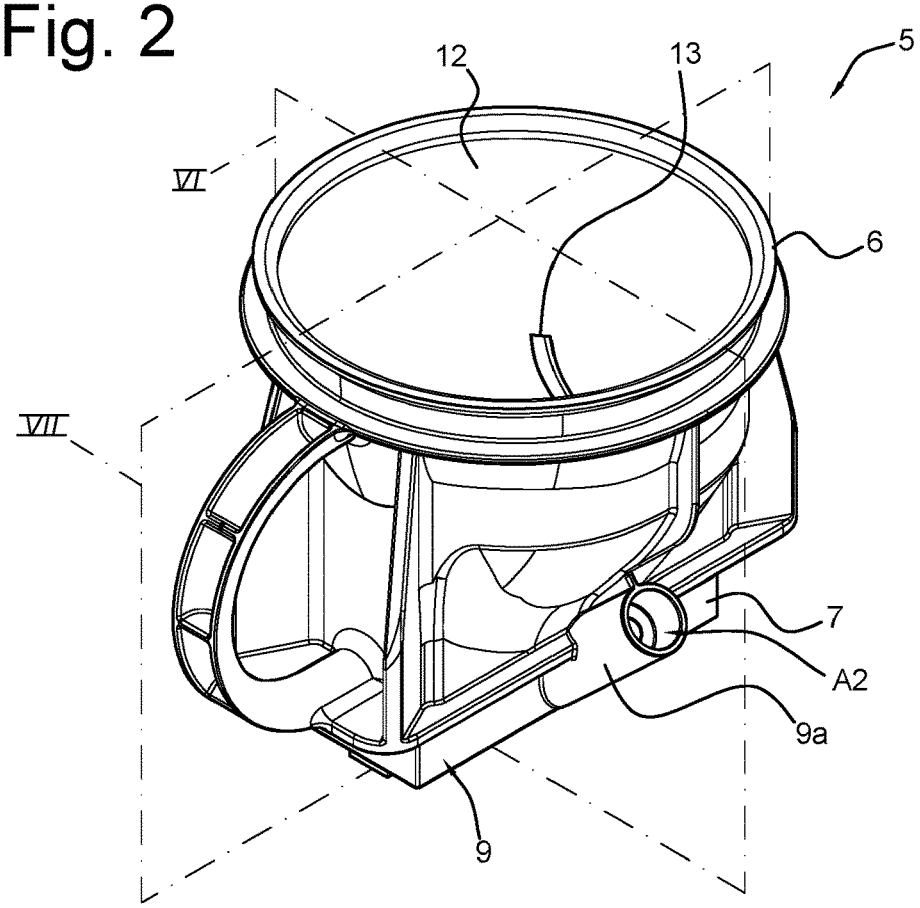
FIG. 2 shows a three dimensional view of an intake side of a discharge nozzle according to an embodiment of the present invention.
Figure 3:
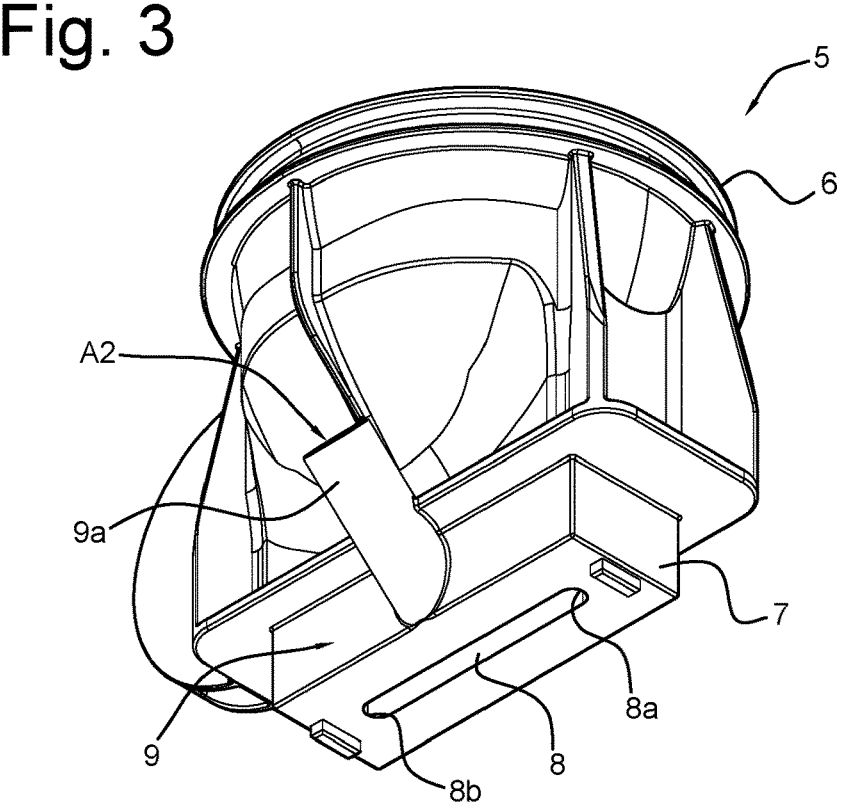
FIG. 3 shows a three dimensional view of an discharge side of a discharge nozzle according to an embodiment of the present invention.
Figure 4:
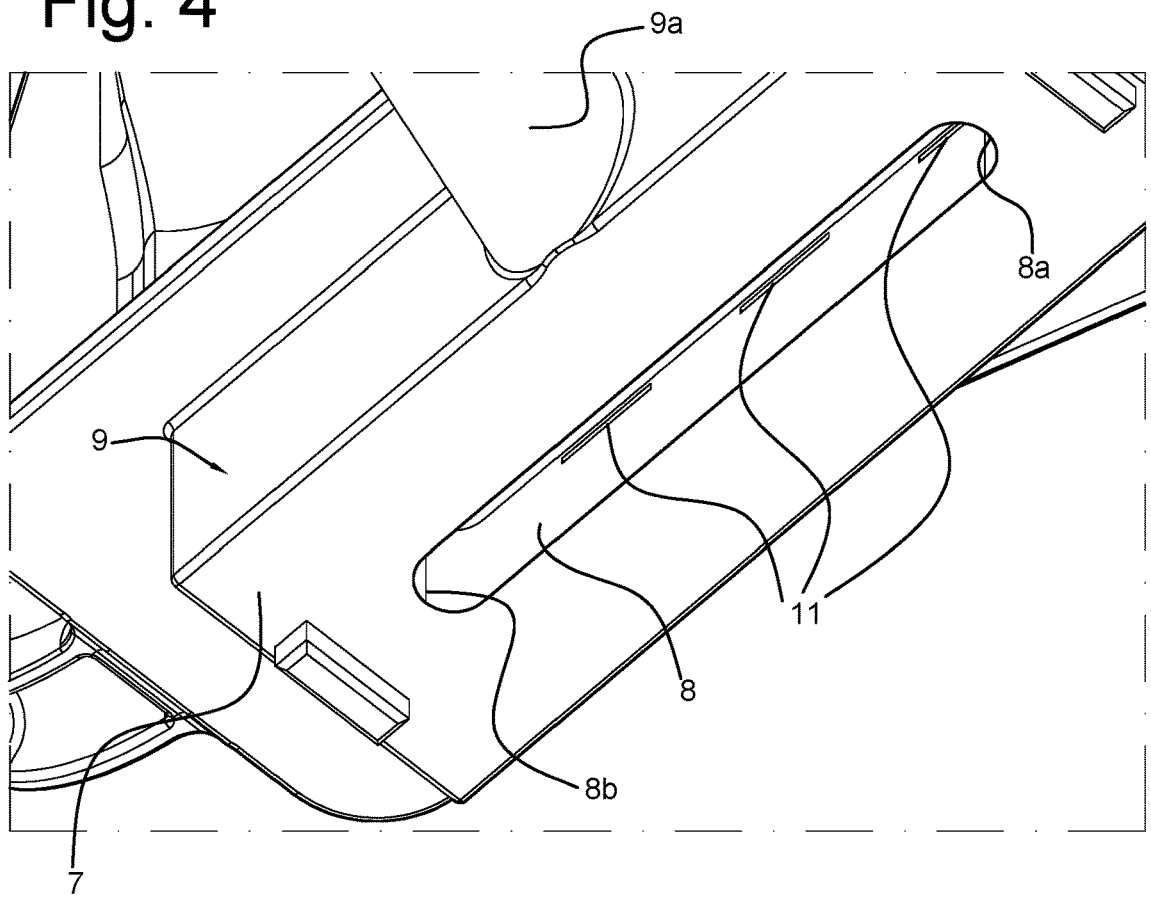
FIG. 4 shows a three dimensional detail view of a discharge channel of a discharge nozzle according to an embodiment of the present invention.

Reference is made to FIG. 1, showing a schematic view of a cyclone separation system 1 according to an embodiment of the present invention, and to FIGS. 2 to 7 showing various views of the discharge nozzle 5 and embodiments thereof as outlined above.

The cyclone separation system 1 of the present invention comprises a main cyclone chamber 2 having a top chamber part 3 and a conical shaped bottom chamber part 4, wherein the top chamber part 3 is connected to one or more intake channels C each of which is arranged for connection to a primary air source providing a primary air stream A1 carrying live insects. In an embodiment, an auxiliary intake channel Ca may be provided to e.g. further control vortex generation in the cyclone separation system 1 than only to depend on the one or more intake channels C for supplying air to the top chamber part 3.

A discharge nozzle 5 is provided having an intake end 6 and a discharge end 7, the intake end 6 being connected to the bottom chamber part 4, and wherein the discharge end 7 comprises a discharge channel 8 for discharging the live insects from the cyclone separation system 1.

The discharge end 7 comprises an air injection member 9 for connection to a secondary air source (not shown) providing a secondary air stream A2 to the air injection member 9, wherein the air injection member 9 comprises an air chamber 10 for connection to the secondary air source. In an exemplary embodiment, the air injection member 9 comprises an air inlet 9*a* a for connecting to the secondary air source and wherein the air inlet 9*a* is fluidly (gaseous) connected to the air chamber 10, see e.g. FIG. 6.

The air injection member 9 further comprises a plurality of primary air injection channels 11 fluidly connecting the air chamber 10 and the discharge channel 8, wherein each of the primary air injection channels 11 is arranged to provide an injected upstream air flow F in an upstream direction U back into the discharge nozzle 5 for stopping the discharge of separated live insects.

As further depicted in the FIGS. 2, 5, 6 and 7, the discharge nozzle 5 comprises an inner wall part 12 extending between the intake end 6 and the discharge channel 8, and wherein the inner wall part 12 comprises a plurality of elongated secondary air injection channels 13, i.e. extending through the inner wall part 12, fluidly connected to the air chamber 10 and extending from the discharge channel 8 in the upstream direction U. Referring to FIG. 5, each of the secondary air injection channels 13 is arranged to provide an injected lateral air flow V along the inner wall part 12.

According to the present invention, the air injection member 9 of the discharge end 7 is configured for injecting air back into the discharge nozzle 5, i.e. in the upstream direction U. In doing so, separated live insects in the discharge nozzle 5 moving in downstream direction D can be stopped and suspended/cushioned in the injected upstream air flow F. Furthermore, the upstream air flow F reduces damage to live insects and minimizes clump formation of live insects in the discharge nozzle 5. The injected upstream air flow F may be provided temporally to also stop the discharge of live insect temporarily.

The plurality of elongated secondary air injection channels 13 are particularly advantageous for further reducing clump formation on the inner wall part 12 by virtue of the lateral air flow V provided by the secondary air injection channels 13 when in use. Each of the secondary air injection channels 13 is capable of inducing a distributed lateral flow or air curtain along its upward length in the upstream direction U. The lateral air flow that can be provided by each of the secondary air injection channels 13 may be seen as a vortex/vortical flow along the inner wall part 12.

It is worth noting that the primary and secondary air injection channels 11, 13 will operate simultaneously when in use as they are both connected to the air chamber 10. So when the air injection member 9 is activated, the upstream air flow F and the lateral air flow V occur simultaneously when the secondary air stream A2 is provided to the air chamber 10.

Referring to FIG. 6, in an embodiment, each of the secondary air injection channels 13 has a height H3 of at least 5% of a height H1 of the inner wall part 12. This embodiment ensures that a distributed lateral air flow V of sufficient height is provided, as measured from the discharge channel 8 in upstream direction U, for removing clumps of live insects. In further embodiments the height H3 of each of the secondary air injection channels 13 lies between 5% and 60% of the height H1 of the inner wall part 12. The height H3 of each secondary air injection channel 13 may be chosen based on expectations and/or experience where clumps or contamination of live insects may develop along the inner wall part 12 near the discharge channel 8 and in the upstream direction U therefrom. In an exemplary embodiment, a common or same height H3 may be chosen for each of the secondary air injection channels 13, so that the lateral air flow V provided by each secondary air injection channel 13 exhibits a similar flow profile and intensity along the inner wall part 12 to achieve uniform cleaning thereof.

In another embodiment, the air chamber 10 has a height H2 equal to or larger than the height H3 of each secondary air injection channel 13, so that the air chamber 10 is able to optimally provide the lateral/vortical air flow V over the entire height H3 of each of the secondary air injection channels 13. It is worth noting that in this embodiment the air chamber 10 has a height H2 equal to or larger than the height H3 of each secondary air injection channel 13 where the air chamber 10 connects to a secondary air injection channel 13. That is, it is conceivable that in an embodiment, see FIG. 7, the air chamber 10 between e.g. two secondary air injection channels 13 exhibits a height H2 that is less than the height H3 of the two secondary air injection channels 13. As long as the height H2 of the air chamber 10 is equal to or larger than the height H3 of each secondary air injection channel 13 when the air chamber 10 connects thereto, then this will ensure optimal lateral/vortical air flow V along the height H3 of each of the secondary air injection channels 13.

In light of FIGS. 5, 6 and 7, another point to note is that, in exemplary embodiments depicted, the air chamber 10 fully encircles the discharge channel 8 and the inner wall part 12 up to height H2, so that the air chamber 10 is connected to each of the primary and secondary air injection channels 11, 13. Furthermore, the plurality of primary and secondary air injection channels 11, 13 form a circumferential spaced apart arrangement of primary and secondary air injection channels 11, 13 distributed around the discharge channel 8 and the inner wall part 12 respectively.

As further shown in FIG. 5, in an embodiment, each of the secondary air injection channels 13 is arranged at an acute angle β with respect to the inner wall part 12. That is, in this embodiment each of the secondary air injection channels 13 extends through the inner wall part 12 at an acute angle with respect thereto. As a result, the lateral or vortical air flow V will exhibit a tangential/parallel flow path along the inner wall part 12 for improved removal of any clumps of live insects that may be present thereon. The smaller the acute angle β, the more tangential/parallel the lateral air flow V will be, hence further improved removal of clumps.

Figure 5:
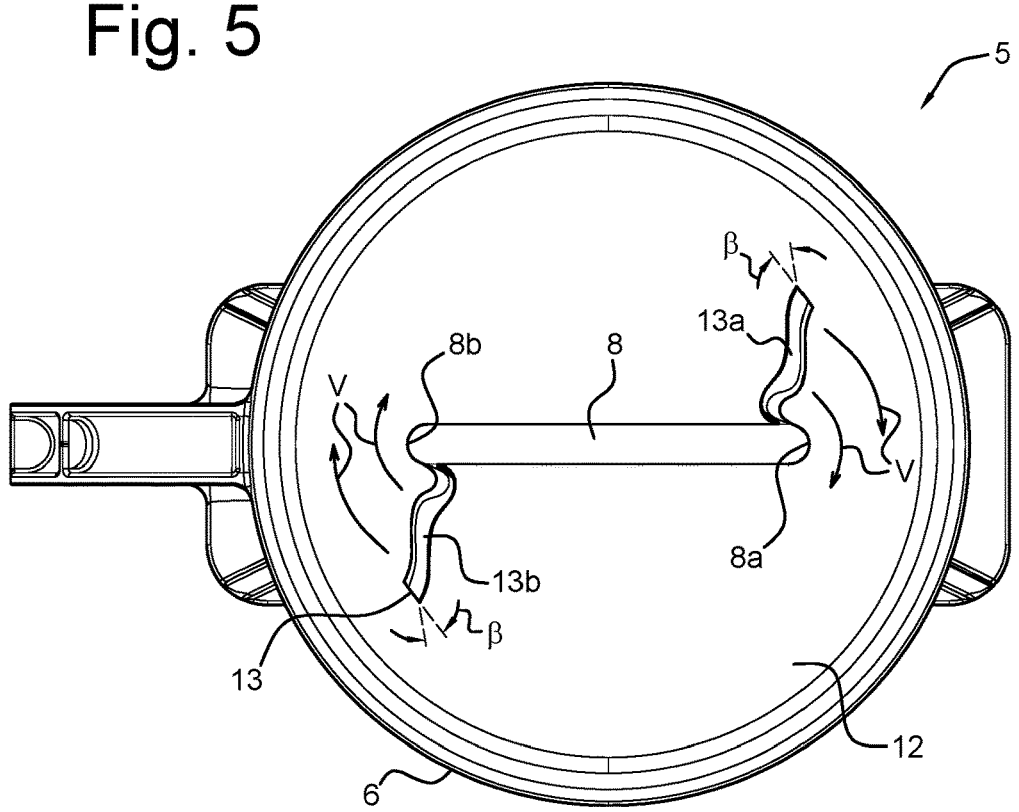
FIG. 5 shows a two dimensional view an intake side of the a discharge nozzle according to an embodiment of the present invention.
Figure 6:
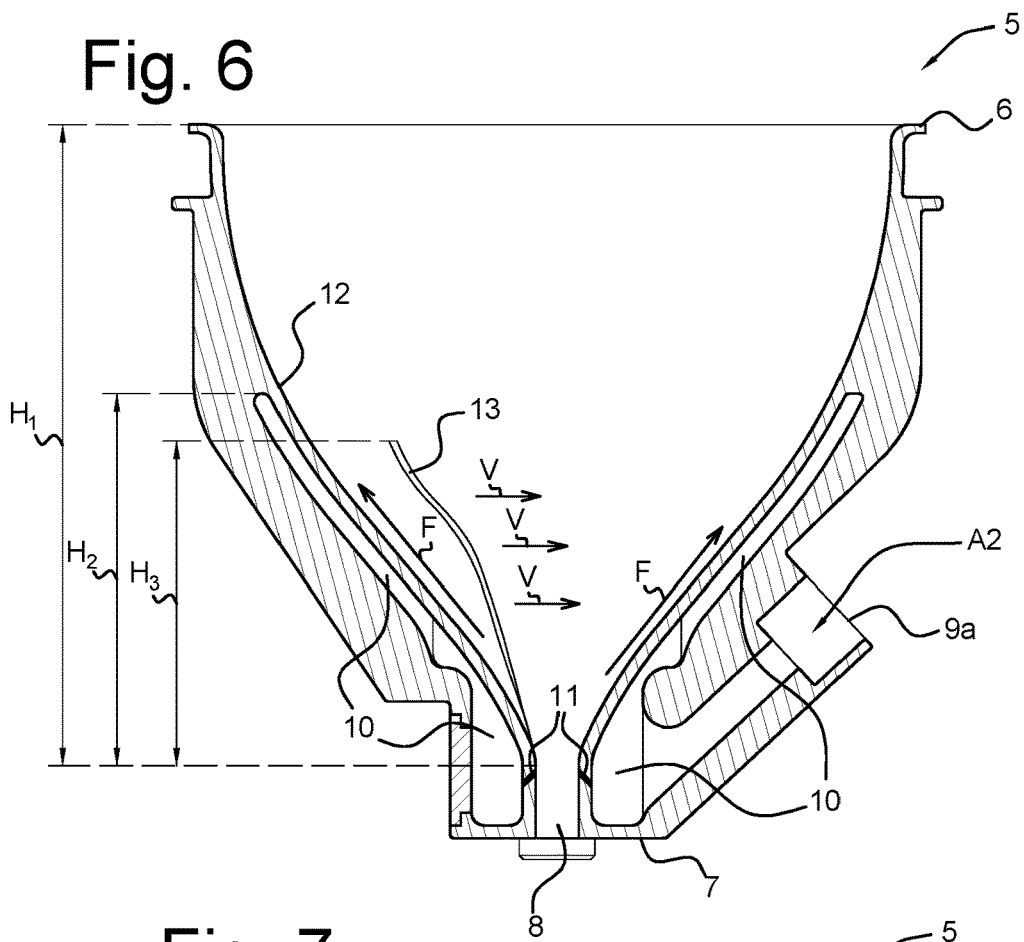
FIG. 6 shows a first cross section of a discharge nozzle according to an embodiment of the present invention.
Figure 7:
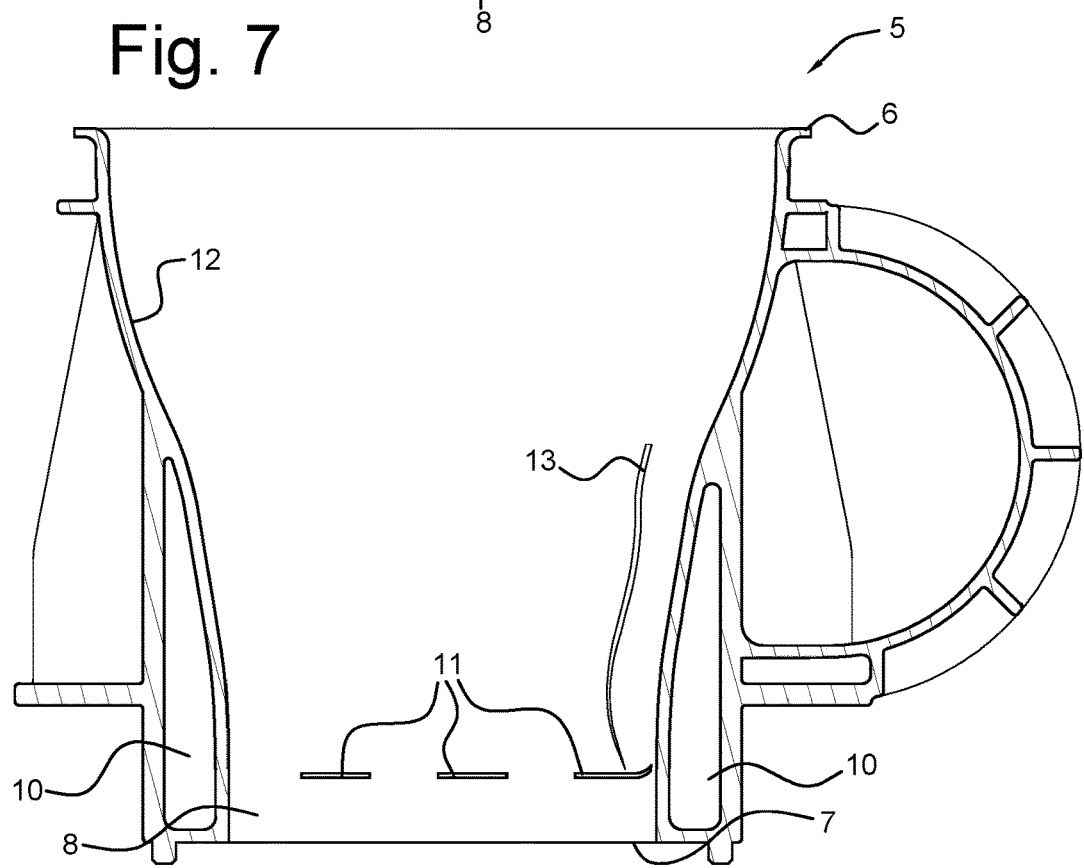
FIG. 7 shows a second cross section of a discharge nozzle according to an embodiment of the present invention.

In FIG. 5 it is further seen that in an embodiment each of the secondary air injection channels 13 may be laterally curved, i.e. sideways curved in a direction substantial parallel to the inner wall part 12. So in this embodiment each of the secondary air injection channels 13 extends along a particular contour of the inner wall part 12 to provide for optimized tangential/parallel lateral air flow V with respect to the inner wall part 12.

In an exemplary embodiment as shown in FIGS. 2 to 7, the inner wall part 12 is funnel shaped extending from a substantially circular intake end 6 to the discharge channel 8, and wherein the discharge channel 8 is substantially rectangular, i.e. being slit shaped. That is, in this embodiment the intake end 6 is substantially circular and wherein the discharge channel 8 is substantially rectangular (slit shaped), and wherein the inner wall part 12 is funnel shaped and extends from the substantially circular intake end 6 to the substantially rectangular discharge channel 8. Then, a first secondary air injection channel 13a of the plurality of secondary air injection channels 13 extends from a first shortest side 8a of the discharge channel 8 in the upstream direction U and wherein a second secondary air injection channel 13b of the plurality of secondary air injection channels 13 extends from an opposing second shortest side 8b of the discharge channel 8 in the upstream direction U.

In this embodiment, the intake end 6 connects to the conical shaped bottom chamber part 4 in which, during operation, live insects move in a vortex flow in the downstream direction D, and continue to do so as they near the substantially rectangular discharge channel 8. As will be discussed in further detail later, the substantially rectangular discharge channel 8 facilitates accurate counting of live insects when discharged through the discharge channel 8.

Due to the transition from a vortical flow of live insects along the inner wall part 12 into the discharge channel 8 may cause clump formation at the inner wall part 12 where it transitions to or engages the first and second shortest sides 8a, 8b of the discharge channel 8. By having the first secondary air injection channel 13a extending from the first shortest side 8a and the second secondary air injection channel 13b extending from the opposing second shortest side 8b allows clump removal from the inner wall part 12 where it transitions to the first and second shortest sides 8a, 8b. Advantageously, this embodiment also prevents clump formation a the first and second shortest sides 8a, 8b as well.

As mentioned earlier, in an embodiment each of the secondary air injection channels 13 may have a height H3 of at least 5% of a height H1 of the inner wall part 12, and in further embodiments the height H3 of each of the secondary air injection channels 13 may be chosen between 5% and 60% of the height H1 of the inner wall part 12. The height H3 of each secondary air injection channel 13 may be chosen based on expectations and/or experience where clumps of live insects may develop along the inner wall part 12 near the discharge channel 8 and in the upstream direction U therefrom. Now, when during operation live insects move in vortex/vortical flow in the downstream direction D and approach the substantially rectangular discharge channel 8, there may be clump formation or contamination of live insects near the first and second shortest sides 8a, 8b of the discharge channel 8. By choosing the height H3 of both the first and secondary air injection channels 13a, 13b to substantially match a transition height along which downward flow of live insects transitions from vortex/vortical flow to substantially non-vortex flow into the discharge channel 8, then this ensures that clump formation near the first and second shortest sides 8a, 8b can be removed adequately through injected lateral air flow V by the secondary air injection channels 13a, 13b. As also depicted in FIG. 5, in an advantageous embodiment, each of the first and shortest sides 8a, 8b of the discharge channel 8 is a rounded, curved or arched side, e.g. substantially semi-circular. The rounded/curved sides 8a, 8b provides for a smoother transition between the inner wall part 12 and the discharge channel 8, thereby reducing turbulent air flow and violent movement of live insects along the inner wall part 12 where it transitions to the first and second shortest sides 8a, 8b. As a result, live insects moving into the discharge channel 8 are not damaged so that survival rates of live insects increase. In addition, clump formation is further reduced because of the smoother transition offered by the rounded sides 8a, 8b.

As outlined earlier, the discharge nozzle 5 is able to temporarily stop discharge of live insects through the discharge channel 5 by temporarily injecting the upstream air flow F by means of the plurality of primary air injection channels 11. At the same time, the lateral air flow is injected by the plurality of secondary air injection channels 13, thereby preventing clogging and clump formation of live insects at the inner wall part 12 of the discharge nozzle 5.

Now, during operation of the cyclone separation system 1, an inner air vortex and an outer air vortex exist concentrically in the top chamber part 3, the conical shaped bottom part 4, as well the discharge nozzle 5. The outer vortex carries live insects and moves in downward direction D, the inner air vortex is clean from live insects and ascends in upstream direction U.

The height at which suspension of live insects in the discharge nozzle 5 occurs as well as maintaining as much vortex air flow in the discharge nozzle 5 as possible can be controlled by the rate at which the inner air vortex moves in upstream direction U.

Figure 8:
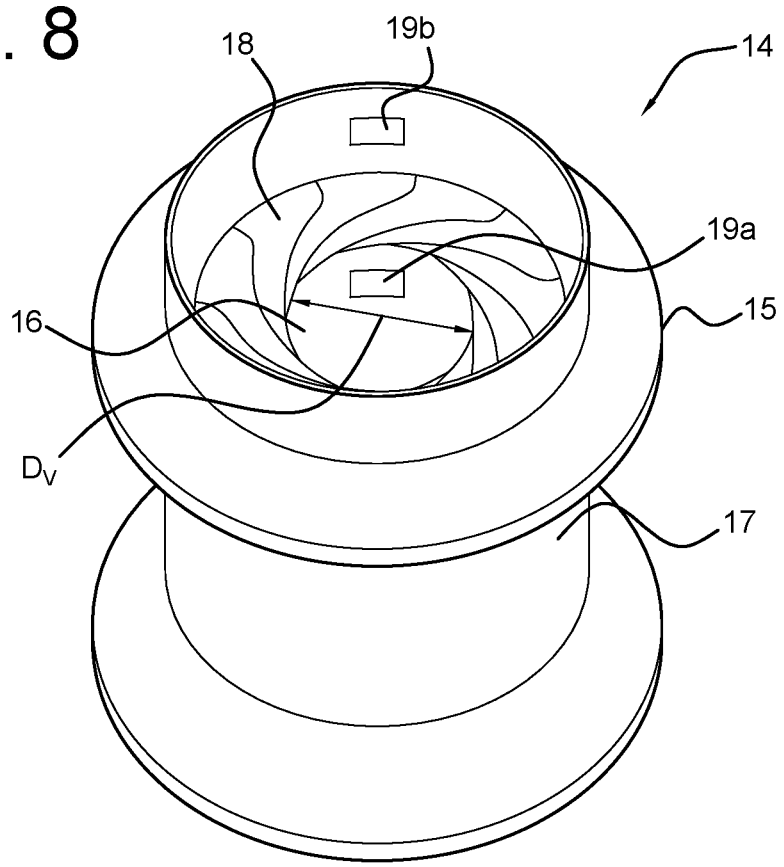
FIG. 8 shows a three dimensional view of an exhaust valve on a top part of the cyclone separation system according to an embodiment of the present invention.
Figure 9:
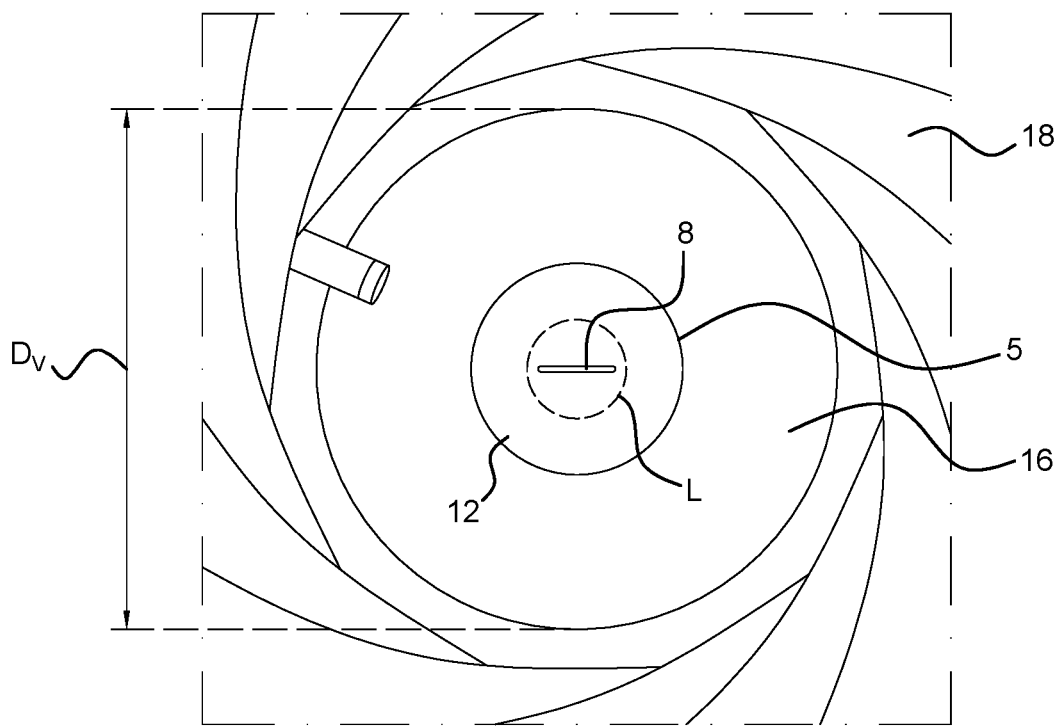
FIG. 9 shows a two dimensional view of an exhaust valve on a top part of the cyclone separation system according to an embodiment of the present invention.

With reference to FIGS. 1, 8 and 9, to provide finer control on the inner vortex, an embodiment is provided wherein the cyclone separation system 1 further comprises an air exhaust part 14 arranged on the top chamber part 3, wherein the air exhaust part 14 comprises an adjustable iris valve 15 configured to regulate a flow rate of ascending exhaust air from the top chamber part 3. Here, the ascending exhaust air can be seen as air from the inner air vortex moving in the upstream direction U and exiting through the air exhaust part 14. The iris valve 15 is advantageous as it provides a centralised adjustable passage 16 having an adjustable valve diameter Dv that aligns with the inner air vortex when the cyclone separation system 1 is in operation.

Flow rate adjustment by the iris valve 15 influences e.g. the height at which suspension of live insects in the discharge nozzle 5 during (temporary) activation of the air injection member 9 occurs as well as the quality of outer vortex air flow in the discharge nozzle 5 carrying the live insects. The height at which suspension may take place inside the discharge nozzle 5 is schematically depicted in FIG. 9, by the imaginary separation line L upstream/above the discharge channel 8.

Therefore, the iris valve 15 in conjunction with the plurality of primary and second air injection channels 11, 13 allows improved control on how suspension of live insects in the discharge nozzle 5 occurs and to prevent clump formation and contamination of the inner wall part 12.

FIGS. 1 and 8 depict an embodiment wherein the air exhaust part 14 comprises a cylindrical lower portion 17 arranged between the iris valve 15 and the top chamber part 3, thereby allowing that a laminar flow behaviour can be achieved when ascending exhaust air from the top chamber part 3 approaches the iris valve 15. This laminar flow behaviour can be advantageous for accurate and reliable flow measurement purposes across the iris valve 15. In an exemplary embodiment, the cylindrical lower portion 17 has a height H4 of at least 1.5 to 3 times of a maximum inner diameter of the cylindrical lower portion 17 for achieving sufficient laminar flow behaviour of ascending exhaust air approaching and flowing through the iris valve 15.

For accurate control and monitoring of vortex behaviour in the cyclone separation system 1, an exemplary embodiment is provided wherein the iris valve 15 comprises an adjustable diaphragm 18 providing the adjustable valve diameter (Dv), a first pressure sensor (19a) on an intake side of the diaphragm 18, and a second pressure sensor (19b) on an exhaust side of the diaphragm 18.

Returning to FIG. 1, the cyclone separation system 1 allows for a batch wise filling process wherein a container 20 is placed underneath the discharge nozzle 5 from which live insects are discharged for a particular amount of time. The discharge is temporarily halted by actuation of the air injection member 9 when a required amount of live insects has been collected in the container 20. As the air injection member 9 halts discharge, the container 20 is removed and another container 20 is placed underneath the discharge nozzle 5 so that the filling process can continue.

To allow for an efficient batch wise filling process of containers, an embodiment is provided wherein the cyclone separation system 1 further comprises a camera-based counting system 21 arranged at/below the discharge end 7 of the discharge nozzle 5 for counting live insects being discharged through the discharge end 7. A transportation system 22 is provided and configured to move the yet to be filled container 20 from an upstream position p1 at which the container 20 is positioned before the discharge end 7, to a discharge position p2 at which the container 20 is arranged underneath the discharge end 7, to a downstream position p3 at which the container 20 is positioned after the discharge end 7. The transportation system 22 comprises an upstream weight sensor 23 at the upstream positioned p1 and a downstream weight sensor 24 at the downstream position p3, wherein each of the upstream and downstream weight sensors 23, 24 are configured to register a total weight of the container 20 when positioned at the upstream or downstream position p1, p3 respectively.

In the above embodiment the number of live insects being discharged can be registered by the camera based counting system 21 and where the upstream and downstream weight sensors 23, 24 allow determination of a weight difference between the total weight of the container 20 at the upstream position p1, so prior to filling, and the total weight of the container 20 at the downstream position p3, so when the container 20 has been filled and moved away from the discharge nozzle 5. By using the camera based counting system 21 in conjunction with the upstream and downstream weight sensors 23, 24 allows for accurate analysis as to the number of live insects being counted versus a corresponding weight thereof. This in turn allows a threshold to be accurately determined as to when the air injection member 9 should be activated for achieving a desired weight of live insects in the container 20 based on the number of live insects counted.

It is worth nothing that in an advantageous embodiment the camera based counting system 21 provides for improved count accuracy when the discharge channel 8 is chosen to be substantially rectangular as mentioned earlier. In particular, an elongated rectangular discharge channel 8 allows for a relatively thin "curtain" or layer of live insects to be discharged through the discharge end 7 during operation, so that live insects do not visually block each other in a line of view of the camera based counting system 21 for achieving an accurate count therefrom.

In an advantageous embodiment, the transportation system 22 may comprise a discharge weight sensor 25 at the discharge position p2, so that the total weight of the container 20 as it is being filled can be monitored in real time and as such may further aid in determining the aforementioned threshold.

Taking the above embodiments of the cyclone separation system 1 into account, a method will now be described of providing batches of live insects. In particular, according to the present invention a method is provided of providing batches of live insects comprising the steps of a) providing a cyclone separation system 1 comprising the camera based counting system 21 and transportation system 22 as mentioned earlier, and a container 20 for the transportation system 22, wherein each of the one or more intake channels C is connected to the primary air source providing the primary air stream A1 carrying live insects, and wherein the air injection member 9 is connected to the secondary air source providing the secondary air stream A2;

b) positioning the container 20 at the upstream position p1 and measuring an upstream total weight of the container 20 by the upstream weight sensor 23;

c) moving the container 20 to the discharge position p2 underneath/below the discharge end 7;

d) discharging live insects through the discharge end 7 into the container 20 and counting live insects as they pass the camera based counting system 21; and based on a counted number of discharged live insects, e) injecting air back into the discharge nozzle 5 with the air injection member 9 for a predetermined time period to temporarily stop discharge of live insects; and during the predetermined time period, f) moving the container 20 with collected live insects to the downstream position p3 and measuring a downstream total weight of the container 20 by the downstream weight sensor 24; and g) determining a total weight difference between the upstream and downstream total weight as measured, and setting a counting threshold for the camera based counting system 21 based on the total weight difference.

As mentioned above, the camera based counting system 21 in conjunction with the upstream and downstream weight sensors 23, 24 allows for accurate analysis as to the number of live insects being counted versus a corresponding weight thereof. The total weight difference is a measure of the weight of live insects that have been discharged in the container 20. Since a total weight difference is determined, the actual weight of the container 20 is not taken into account. As a result, the method is able to provide a batch wise process in which different containers 20 may exhibit different total weights when measured by the upstream weight sensor 23. Weight variability of the container 20 is therefore allowed and provides for an advantageous embodiment wherein the step of a) further comprises providing the container 20 with feed for live insects. In this embodiment the container 20 may contain a particular amount of feed for live insects as it at arrives at the upstream position p1. Since the feed may exhibit some weight variability, the total weight difference determined is step g) will not include this weight variability of feed in the container 20 and so the threshold for activating the air injection member 9 can still be accurately determined.

Figure 10:
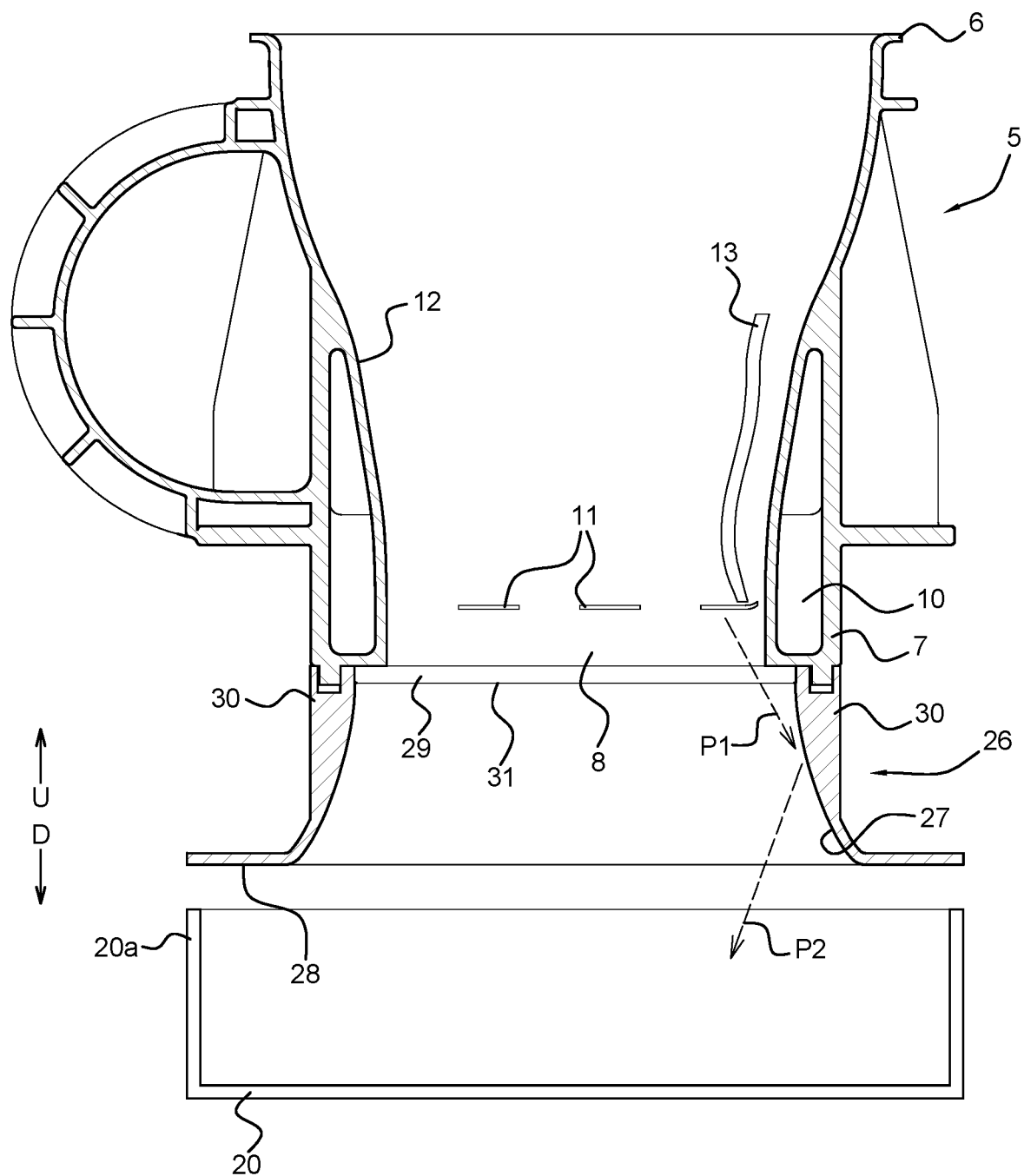
FIG. 10 shows a cross section of a discharge guiding member mounted to a discharge nozzle according to an embodiment of the present invention.

Referring to FIG. 10, to prevent live insects from missing the container 20 when being discharged from the discharge end 7, an embodiment is provided wherein the discharge nozzle 5 further comprises a discharge guiding member 26 mounted to/underneath the discharge end 7 of the discharge nozzle 5. The discharge guiding member 26 comprises an expanding guiding channel 27 fluidly coupled to the discharge channel 8 for receiving live insects therefrom when the cyclone separation system 1 is in operation. In this embodiment the guiding channel 27 expands in the downstream direction D as depicted. This embodiment allows live insects to follow a discharge path P1 out of the discharge channel 8 to be deflected by the guiding channel 27 and to subsequently follow a deflected discharge path P2 into the container 20.

In an advantageous embodiment, the discharge guiding member 26 may further comprise a lower circumferential/peripheral rim portion 28, e.g. a circumferential/peripheral flange portion 28, configured to engage an upper circumferential/peripheral rim portion 20a of the container 20 for sealing said container 20 during discharge of live insects. The lower circumferential rim or flange portion 28 can be used, for example, to cover a part of the container 20 when the guiding channel 27 is less wide than the container 20, i.e. less wide than the upper circumferential/peripheral rim portion 20a of the container 20. This ensures that the container 20 remains sufficiently sealed from above for preventing live insects escaping the container 20 when discharged therein.

As further depicted in FIG. 10, the discharge guiding member 26 may be configured to provide a laterally extending slot/slit 29 when connected to the discharge end 7. The laterally extending slot 29 allows counting of live insects by the camera based counting system 21 (not shown) when live insects exit the discharge channel 8. In particular, a line of view of the camera based counting system 21 is able to extend through the laterally extending slot 29 to register live insects during operation. Advantageously, the laterally extending slot 29 may be sufficiently narrow to prevent live insects escaping there through.

When the discharge channel 8 is substantially rectangular, then the laterally extending slot 29 may preferably have a length that is equal to or larger than the longest sides of the rectangular discharge channel 8, thereby ensuring that all live insects passing through the discharge channel 8 are observable by the camera based counting system 21.

As further depicted in FIG. 10, in an exemplary embodiment the discharge guiding member 26 comprises an upper connecting edge 30 configured to connect to the discharge end 7 of the discharge nozzle 5, and wherein the upper connecting edge 30 comprises a recessed edge portion 31, which provides for the laterally extending slot 29 when the upper connecting edge 30 engages the discharge end 7.

The present invention has been described above with reference to a number of exemplary embodiments as shown in the drawings. Modifications and alternative implementations of some parts or elements are possible, and are included in the scope of protection as defined in the appended claims.

The invention claimed is:

1. A cyclone separation system for separating live insects carried by an air stream, comprising:
 a main cyclone chamber having a top chamber part and a conical shaped bottom chamber part, wherein the top chamber part is connected to one or more intake channels, each of which is arranged for connection to a primary air source providing a primary air stream carrying live insects;
 a discharge nozzle having an intake end and a discharge end, the intake end being connected to the bottom chamber part, and wherein the discharge end comprises a discharge channel for discharging the live insects from the cyclone separation system,
 wherein the discharge end comprises an air injection member for connection to a secondary air source providing a secondary air stream to the air injection member, wherein the air injection member comprises an air chamber for connection to the secondary air source, and a plurality of primary air injection channels fluidly connecting the air chamber and the discharge channel, wherein each of the primary air injection channels is arranged to provide an injected upstream air flow in an upstream direction back into the discharge nozzle for stopping the discharge of the separated live insects, and wherein the discharge nozzle comprises an inner wall part extending between the intake end and the discharge channel, and wherein the inner wall part comprises a plurality of elongated secondary air injection channels fluidly connected to the air chamber and extending from the discharge channel in the upstream direction, and wherein each of the secondary air injection channels is arranged to provide an injected lateral air flow along the inner wall part.

2. The cyclone separation system according to claim 1, wherein each of the secondary air injection channels has a height of at least 5% of a height of the inner wall part.

3. The cyclone separation system according to claim 2, wherein the air chamber has a height equal to or larger than the height of each secondary air injection channel.

4. The cyclone separation system according to claim 1, wherein each of the secondary air injection channels are arranged at an acute angle with respect to the inner wall part.

5. The cyclone separation system according to claim 1, wherein each of the secondary air injection channels is laterally curved.

6. The cyclone separation system according to claim 1, wherein the intake end is substantially circular and wherein the discharge channel is substantially rectangular, and wherein the inner wall part is funnel shaped and extends from the substantially circular intake end to the substantially rectangular discharge channel, wherein a first secondary air injection channel of the plurality of secondary air injection channels extends from a first shortest side of the discharge channel in the upstream direction and wherein a second secondary air injection channel of the plurality of secondary air injection channels extends from an opposing second shortest side of the discharge channel in the upstream direction.

7. The cyclone separation system according to claim 6, wherein each of the first and second shortest sides is a rounded, curved, or arched side.

8. The cyclone separation system according to claim 1, further comprising an air exhaust part arranged on the top chamber part, wherein the air exhaust part comprises an adjustable iris valve configured to regulate a flow rate of ascending exhaust air from the top chamber part.

9. The cyclone separation system according to claim 8, wherein the air exhaust part comprises a cylindrical lower portion arranged between the iris valve and the top chamber part.

10. The cyclone separation system according to claim 9, wherein the cylindrical lower portion has a height of at least 1.5 to 3 times of a maximum inner diameter of the cylindrical lower portion.

11. The cyclone separation system according to claim 9, wherein the iris valve comprises an adjustable diaphragm providing an adjustable valve diameter, a first pressure sensor on an intake side of the diaphragm, and a second pressure sensor on an exhaust side of the diaphragm.

12. The cyclone separation system according to claim 1, further comprising a camera-based counting system arranged at the discharge end of the discharge nozzle for counting live insects being discharged through the discharge end;
 a transportation system configured to move a container from an upstream position at which the container is positioned before the discharge end, to a discharge position at which the container is arranged underneath the discharge end, to a downstream position at which the container is positioned after the discharge end;
 wherein the transportation system comprises an upstream weight sensor at the upstream position and a downstream weight sensor at the downstream position, wherein each of the upstream and downstream weight sensors are configured to register a total weight of the container when positioned at the upstream or downstream position respectively.

13. The cyclone separation system according to claim 12, wherein the transportation system comprises a discharge weight sensor at the discharge position.

14. A method of providing batches of live insects, comprising:
 a) providing a cyclone separation system according to claim 12 and a container for the transportation system, wherein each of the one or more intake channels is connected to the primary air source providing the primary air stream carrying live insects, and wherein the air injection member is connected to the secondary air source providing the secondary air stream;
 b) positioning the container at the upstream position and measuring an upstream total weight of the container by the upstream weight sensor;
 c) moving the container to the discharge position underneath the discharge end;
 d) discharging live insects through the discharge end into the container and counting live insects as they pass the camera-based counting system; and based on a counted number of discharged live insects;
 e) injecting air back into the discharge nozzle with the air injection member for a predetermined time period to temporarily stop discharge of live insects; and during the predetermined time period,
 f) moving the container with collected live insects to the downstream position and measuring a downstream total weight of the container by the downstream weight sensor; and
 g) determining a total weight difference between the upstream and downstream total weight as measured, and setting a counting threshold for the camera-based counting system based on the total weight difference.

15. The method according to claim 14, wherein the step of a) further comprises providing the container with feed for live insects.

* * * * *